Figure 1:
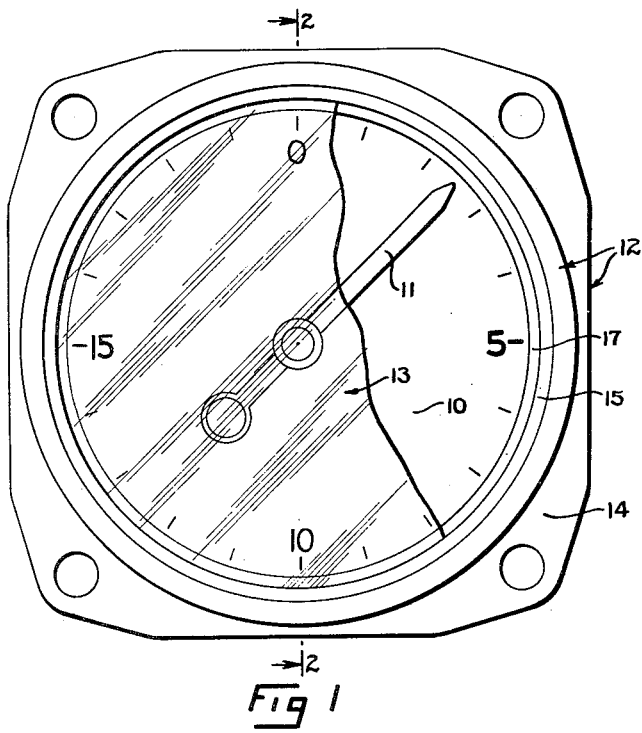

Jan. 30, 1945.  J. BERGE  2,368,105

INSTRUMENT ASSEMBLY

Filed Aug. 16, 1941

INVENTOR
Joseph Berge
BY F. Bascom Smith
ATTORNEY

Patented Jan. 30, 1945

2,368,105

UNITED STATES PATENT OFFICE 2,368,105

INSTRUMENT ASSEMBLY

Joseph Berge, East Orange, N. J., assignor to Jaeger Watch Company, Inc., New York, N. Y., a corporation of New York Application August 16, 1941, Serial No. 407,241

9 Claims. (Cl. 220—82)

This invention relates to indicating instruments, and more particularly to means for mounting elements of such instruments.

Instruments of the type adapted to give a visual indication are invariably provided with transparent face plates, and the means heretofore commonly utilized for mounting these plates consisted of a snap-ring forced into a groove in the instrument casing so as to bear against the plate and press the latter into engagement with a rigid shoulder. This type of mounting is relatively rigid and absorbs none of the shocks to which the casing is subjected, and does not cushion the plate against forces applied directly thereto. It thus offers a minimum protection against breakage and fracture of the plate. Where a waterproof and airtight mounting of the plate is desired, it has been the practice to use resilient gaskets in combination with snap-rings and complex gasket retaining and compressing devices which complicate the assembly of the instrument and increase production and manufacturing costs. It is accordingly an object of the present invention to provide a novel mounting for the transparent face plate of an indicating instrument, said mounting being more simple, economical and effective than the snap ring type mounting.

Another object is to provide a novel plate mounting which is fluid-tight and comprises parts which are readily and economically fabricated and assembled.

A further object is to provide novel means for mounting and holding the transparent plate members of indicating instruments, said means being adapted for effectively holding plates of varying thicknesses.

Another object is to provide a novel plate mounting means including a member of yieldable material, said material being held under compression in order to produce the plate retaining force.

These and other objects and novel features of the invention will more fully appear from the following detailed description when the same is read in connection with the accompanying drawing. It is to be expressly understood, however, that the drawing is for the purpose of illustration only and is not intended to define the limits of the invention, reference for this latter purpose being had primarily to the appended claims.

Figure 2:
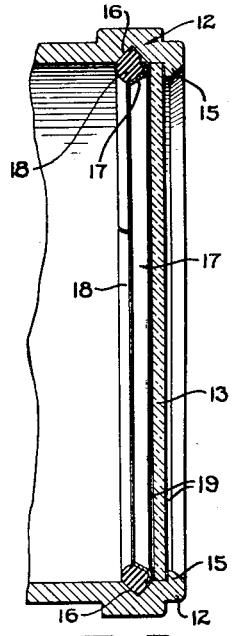
Figure 3:
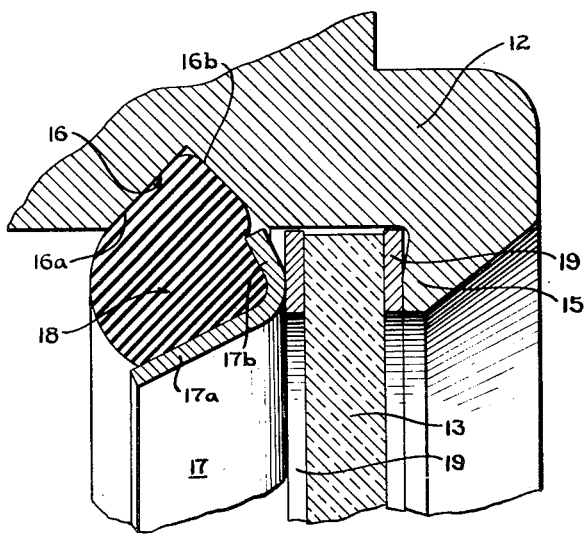

In the drawing, wherein like reference characters refer to like parts throughout the several views, Fig. 1 is a front elevation of an instrument embodying the present invention;

Fig. 2 is a sectional view, with parts broken away, taken substantially along line 2—2 of Fig. 1, said view showing the instrument with the indicating mechanism removed therefrom so as to more clearly illustrate the novel plate mounting in the casing; and Fig. 3 is an enlarged view of a portion of the structure of Fig. 2.

The novel plate mounting means of the present invention are illustrated, by way of example, as embodied in an indicating instrument of the dial type comprising an actuating mechanism, a face plate 10 having a suitable scale calibrated thereon, a pointer 11 actuated by said mechanism for cooperation with said scale to give an indication, and a casing 12 for housing the above parts. A flange 14 is preferably formed on casing 12 to provide means for attaching the instrument to an instrument panel or other mounting member. A transparent plate 13 is mounted in the front end of casing 12 in a novel manner so as to be cushioned against impact forces directed from the face end of the instrument, thereby minimizing the possibility of breakage and injury to the plate and the dial. As shown, the novel mounting means for the plate comprise an inwardly extending shoulder 15 formed in the front end of casing 12 and an annular groove 16 formed in the wall of said casing, said groove being axially spaced in a rearward direction from said shoulder. Plate 13 is located between said shoulder and groove and is resiliently urged in the direction of said shoulder by means comprising a metallic retaining ring 17 and a member 18 of yielding material, such as rubber or rubber covered wire, disposed between said ring and the walls of groove 16. A pair of relatively thin gaskets 19, for example, of paper, are preferably provided on both sides of plate 13, being disposed between the plate and shoulder 15 and between the plate and ring 17.

Ring 17, as shown, is preferably of rigid metal and is stamped or otherwise fabricated as a closed unit, being angular in cross-section (Fig. 3). Groove 16 is preferably V-shaped in cross-section with wall 16a thereof converging in the direction of side 17a or ring 17, said wall being disposed at an acute angle to said side. Side 17b of said ring is inclined at an obtuse angle to wall 16b of said groove, and terminates close to said wall. Wall 16a and side 17a are spaced apart a substantial distance so that an annular chamber having an annular recess facing the rear end of the casing is formed between the sides of ring 17 and the walls of groove 16. As a result, when a mass of yielding material, such as member 18, is forced into the chamber through the recess, it is confined and retained between the walls of said groove and the sides of said ring. It is to be noted that the angular relation between the wall of the groove and the sides of the rigid ring is such that when the resilient member is forced into the cavity formed by the groove and ring, said member is prevented thereby from working out under vibrations or other influences.

Member 18 preferably consists of a single length of relatively soft rubber having free ends and being of a sufficient volume to be compressed when confined between ring 17 and the walls of groove 16. Expansion of said member forces ring 17 in the direction of plate 13, urging the latter toward shoulder 15 so that said shoulder determines the mounted position of said plate.

It is to be noted that if the plates 13 are of varying thicknesses the effectiveness of this form of mounting is not impaired since ring 17 is axially displaceable so as to compensate for any differences in plate thickness without necessitating modifications in the dimensions of the parts of the mounting. Ring 17 also serves to make member 18 invisible from the front end of the instrument and thereby augments the decorative effect of the mounting.

To assemble an instrument provided with the above described mounting, plate 13, which may be a dial or a window for a dial, is inserted into casing 12 from the rear thereof in the direction of shoulder 15. One of gaskets 19 may be first disposed between said plate and shoulder and a second gasket may be located on the rear face of said plate. Ring 17 is then positioned in said casing and thereafter member 18 is forced between said ring and the walls of groove 16. To position member 18, one end is first forced into the retaining space and then the remainder thereof is progressively pressed into position. The indicating mechanism including the dial is thereafter positioned in casing 12 and operatively secured thereto, completing the assembly of the instrument.

There is thus provided a novel mounting for the face plate of an indicating instrument, said mounting cushioning the plate against impact and being adapted to effectively hold plates having different thicknesses. The mounting renders the front end of the casing fluid-tight, has no parts which must be snapped into position and can be assembled or disassembled quickly in a minimum number of operations requiring no special skill or tools. Moreover, the several parts of the mounting are of simple construction and can be economically manufactured from relatively inexpensive materials.

Although only a single embodiment of the invention has been illustrated and described, it is to be expressly understood that the same is not limited thereto. For example, it will now be apparent to those skilled in the art that instead of providing a resilient mounting on one side of the plate and a rigid shoulder on the other side of the plate, the resilient mounting comprising a groove, a yielding member and a ring can be used on both sides of the plate. Yielding materials other than rubber can be employed as the substances for member 18. Various other changes may be made in the design and arrangement of parts without departing from the spirit and scope of the invention. For a definition of the invention, reference will be primarily had to the appended claims.

What is claimed is:

1. In an instrument having a casing and a face plate, an inwardly extending shoulder formed in said casing, the latter having an annular internal groove spaced axially from said shoulder, said plate being located between said groove and shoulder, and means for yieldably retaining said plate in a position determined by said shoulder, said means comprising a rigid ring freely mounted relative to said casing and contacting the face plate, said ring being located opposite said groove, and a mass of resilient material radially compressed between the walls of said groove and a wall of said ring which converges away from said plate whereby the latter is yieldably urged in the direction of said plate for pressing the latter in the direction of said shoulder.

2. In apparatus for mounting a face member in an instrument, a shoulder disposed on one side of said member, and means located on the other side of said member for pressing the latter into engagement with said shoulder, said means comprising a ring of rigid material freely mounted in said casing to bear against said member, a groove being formed in the wall of said instrument opposite said ring, and a mass of yieldable material compressed in the space between said ring and the walls of said groove, said ring having a cone-like external surface engaged by said yieldable material and converging away from said member whereby the expansion of said yieldable material tends to move said ring in the direction of said member to yieldably force the latter against said shoulder.

3. In apparatus for mounting a face member in an instrument, means for applying a holding pressure to said member, said means comprising a ring of metal angular in transverse cross-section, the vertex of the angle being in contact with said member, a groove being formed in the wall of said instrument opposite said ring, the latter having the angularly disposed sides thereof forming a V-shaped channel opening in the direction of said groove, and a mass of yieldable material compressed in said channel and said groove, whereby at least a component of the expansive force exerted by said mass of material urges said ring in the direction of said face member to apply a holding force to the latter.

4. In an instrument having a casing and a face member, an inwardly extending shoulder in said casing and means for yieldably urging said face member into engagement with said shoulder, said means consisting solely of a ring-like retaining member freely mounted in said casing to engage said face member on the opposite side from said shoulder, said retaining member having an external surface converging away from said face member, and a member of resilient material under radial compression between said surface and said casing so as to apply a force to said retaining member pressing the latter against said face member.

5. In an instrument, a casing, a face member, and means for applying a yieldable holding force against one side of said member consisting of a ring-shaped retaining member freely mounted in said casing opposite a groove in the latter to engage said face member, said retaining member having an external surface converging away from said face member, and an annular member of resilient material radially compressed between said surface and said casing to yieldingly urge said retaining member in the direction of said face member, said material being retained in said groove by said retaining member.

6. In apparatus of the class described, a casing, a rigid ring-like member in said casing, means for holding said member against movement in one direction, said member engaging said means and having an external annular surface converging away from said means, and means for yieldably urging said member in said direction, said last-named means consisting solely of radially compressed resilient means interposed between said surface and a groove in the wall of said casing, said member being interposed between said holding means and said yieldable means.

7. In apparatus of the class described, a casing having a groove in the wall thereof, an abutment in said casing, a transversely extending member in said casing having the periphery thereof between said abutment and groove, and means for yieldingly holding said member in a position determined by said abutment, said means comprising a rigid ring-like element engaging said member and resilient means under radial compression, said element being interposed between said resilient means and said member, and said resilient means being interposed between the walls of said groove and said element, said element and groove having oppositely facing annular surfaces each converging away from said member and engaged by said resilient means whereby the resultant of the expansive force of said resilient means against said element has at least a component acting in the direction of said member.

8. In apparatus of the class described, a casing having a groove in the wall thereof, an abutment in said casing, a transversely extending member in said casing having the periphery thereof between said abutment and groove, and means for yieldingly holding said member in a position determined by said abutment, said means comprising a rigid ring-like element engaging said member and resilient means under radial compression, said resilient means being interposed between cone-like surfaces of said groove and element, each of which surfaces converge toward the axis of said casing when extended away from said member.

9. In apparatus of the class described, means for closing and opening in a casing including a face member, said casing having an internal groove therein, an abutment in said casing for limiting movement of said member in one direction away from said groove, and means for applying a pressure for yieldably urging said member toward said abutment comprising a ring of rigid material in said casing opposite said groove and bearing against said first-named means and a mass of radially compressed resilient material in the space between said ring and the walls of said groove, said ring having a peripheral surface converging away from said member and engaged by said resilient mass whereby the expansive force exerted by said mass urges said ring in the direction of said member to yieldably hold the latter against said abutment.

JOSEPH BERGE.